United States Patent
Schuller et al.

(10) Patent No.: US 6,327,964 B1
(45) Date of Patent: Dec. 11, 2001

(54) RECIPROCATING PUMP

(75) Inventors: Wolfgang Schuller, Sachsenheim; Ursula Eckstein, Schwieberdingen, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/341,952

(22) PCT Filed: Oct. 21, 1998

(86) PCT No.: PCT/DE98/03037

§ 371 Date: Jul. 21, 1999

§ 102(e) Date: Jul. 21, 1999

(87) PCT Pub. No.: WO99/35401

PCT Pub. Date: Jul. 15, 1999

(30) Foreign Application Priority Data

Jan. 9, 1998 (DE) .............................. 198 00 499

(51) Int. Cl.⁷ ..................... F16J 9/00; F16J 1/00
(52) U.S. Cl. ................... 92/248; 92/255; 92/DIG. 1
(58) Field of Search .............. 92/259, 248, 255, 92/DIG. 1; 417/470, 471

(56) References Cited

U.S. PATENT DOCUMENTS 6,109,896 * 8/2000 Schuller et al. ................... 417/549

FOREIGN PATENT DOCUMENTS

19712147-A1 * 3/1998 (DE) .
1603849 * 12/1981 (GB) .
0519533-A1 * 12/1992 (GB) .

* cited by examiner

Primary Examiner—Edward K. Look
Assistant Examiner—Michael Leslie
(74) Attorney, Agent, or Firm—Ronald E. Greigg

(57) ABSTRACT

The invention relates to a piston pump with a piston (10) that is guided so that it can move axially in a pump bore (12) of a pump housing (14). In order to simplify the manufacture of the piston (10), the invention proposes providing the piston (10) with a support ring (64), which is connected to a guide ring (66). By connecting the support ring (64) and guide ring (66), the structural length of the piston pump (10) can be shortened.

16 Claims, 2 Drawing Sheets

RECIPROCATING PUMP

PRIOR ART

The invention is based on a piston pump, for hydraulic vehicle brake systems.

A piston pump of this kind is described in the German Patent Application DE 197 12 147.0. The piston pump in said application has a pump housing in which essentially cylindrical pistons are contained so that they can slide in the axial direction and can be driven into a reciprocating stroke motion in the axial direction, for example by means of a cam that can be driven to rotate. For its axial guidance in the pump housing, the piston has a guide ring slid onto it, which reciprocates together with the piston in the pump housing. In order to secure the guide ring on the piston in the axial direction, a support ring is attached to the piston and the guide ring rests against one end face of this support ring. In the piston pump described, the guide ring and the support ring are disposed on the piston so that the support ring supports the guide ring in the axial direction in opposition to a pressure produced by the piston in a displacement chamber of the piston pump during a feed stroke of the piston pump.

ADVANTAGES OF THE INVENTION

In the piston pump according to the invention, the guide ring and the support ring are connected to each other in a detachable or non-detachable manner. Firstly, this has the advantage of a reduced assembly cost since only one ring has to be slid onto the piston and has the advantage of a reduced assembly error frequency since the support ring and the guide ring cannot be mounted on the piston in reverse order nor can one of the two rings be forgotten. Another advantage is that a structural length of the piston and therefore also of the pump housing can be shortened by an axial thickness of the guide ring, wherein the shortening of the pump housing in particular could be significant in the future when used in slip-controlled hydraulic vehicle brake systems. Moreover there is the advantage that between the support ring and the pump housing, there is no pinch gap into which the guide ring could intrude.

In an embodiment of the invention provision is made to press the support ring with frictional, non-positive fit onto the piston in order to fix the support ring axially on the piston.

In an embodiment of the invention the support ring is supported axially in at least one direction against a support face embodied on the piston. The support face can, for example, be embodied circumferentially as a flank of a groove that is let into the piston and in which the support ring engages with positive fit. The support face can also be embodied circumferentially as a transition from a smaller diameter section of the piston to a larger diameter section, against which the support ring is axially supported with a positive fit in one direction. As other possibilities, the support face can be embodied at one or a number of points of the circumference of the piston in the form of radially protruding projections or recesses in the piston circumference in which the support ring engages with a positive fit.

The piston pump according to the invention is particularly provided as a pump in a brake system of a vehicle and is used when controlling the pressure in wheel brake cylinders. The abbreviations ABS, ASR, FDR, or EHB are used for such brake systems, depending on the type of brake system. In the brake system, the pump serves for instance to return brake fluid from a wheel brake cylinder or a plurality of wheel brake cylinders to a master cylinder (ABS) and/or to supply brake fluid out of a storage tank into a wheel brake cylinder or a plurality of wheel brake cylinders (ASR, FDR, or EHB). The pump is required, for example, in a brake system with wheel slip control (ABS or ASR) and/or a brake system serving as a steering aid (FDR) and/or an electro-hydraulic brake system (EHB). With wheel slip control (ABS or ASR), for example, a locking of the wheels of the vehicle during a braking event can be prevented when there is strong pressure on the brake pedal (ABS) and/or a spinning of the driven wheels of the vehicle can be prevented when there is strong pressure on the gas pedal (ASR). In a brake system that serves as a steering aid (FDR), a brake pressure is built up in one or more wheel brake cylinders independently of an actuation of the brake pedal or gas pedal, for instance to prevent the vehicle from breaking out of the track desired by the driver. The pump can also be used in an electrohydraulic brake system (EHB) in which the pump supplies the brake fluid into the wheel brake cylinder or cylinders if an electrical brake pedal sensor detects an actuation of the brake pedal or in which the pump is used to fill a reservoir of the brake system.

BRIEF DESCRIPTION OF THE DRAWINGS

The invention will be explained in more detail below in conjunction with an exemplary embodiment represented in the drawings.

DESCRIPTION OF THE EXEMPLARY EMBODIMENT

Figure 1:
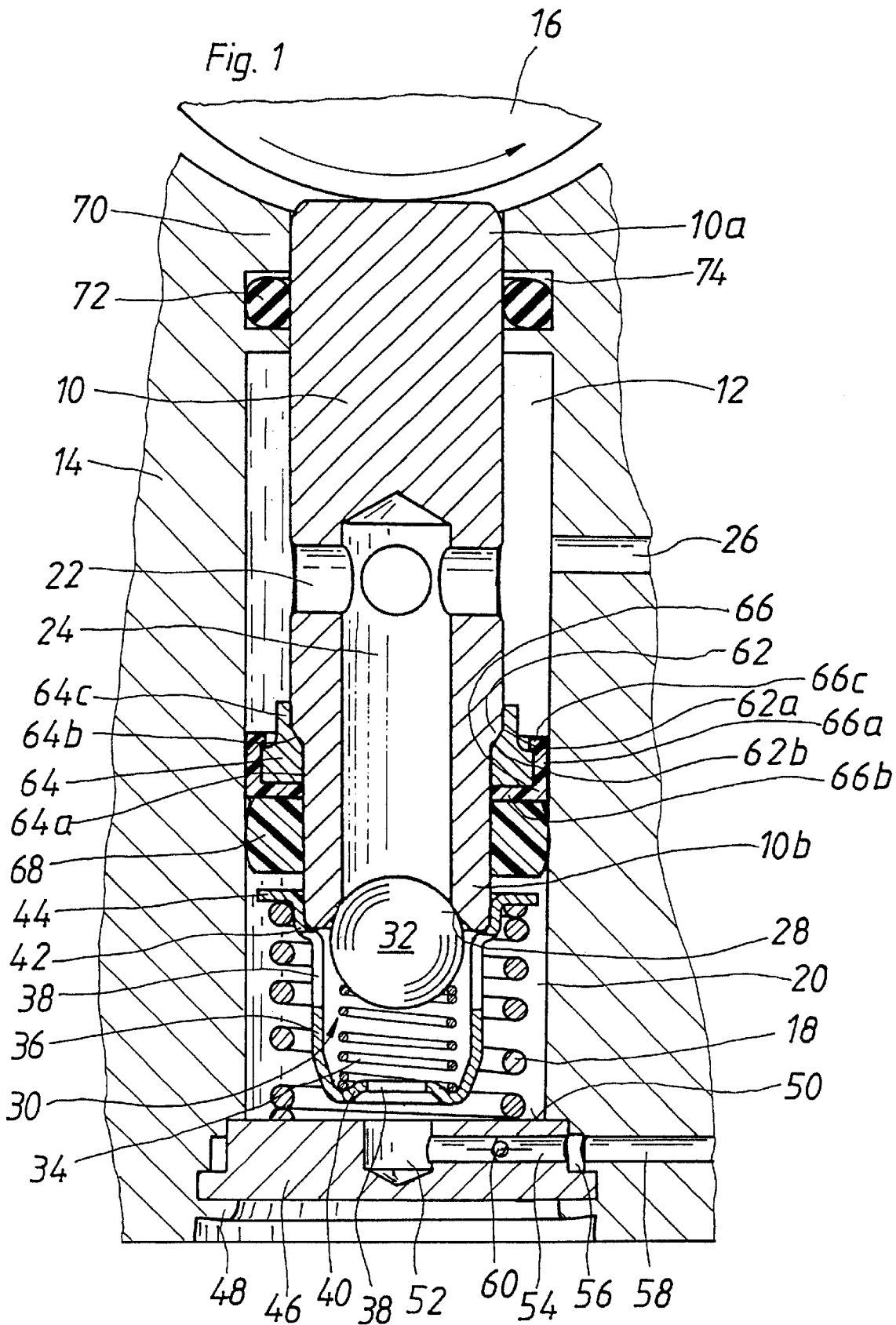
FIG. 1 shows the piston pump according to the invention in an axial section.

The piston pump according to the invention represented in FIG. 1 has an essentially cylindrical piston 10 that is contained so that the piston can move axially in a stepped, continuous pump bore 12 in a hydraulic block that constitutes a pump housing 14 and belongs to a slip-controlled, hydraulic vehicle brake system that is not otherwise shown. Only a fraction of the hydraulic block that constitutes the pump housing 14 is shown for the sake of a clear depiction. Besides the piston pump, other hydraulic components, not shown, such as solenoid valves, hydraulic accumulators, and hydraulic dampers of the vehicle brake system are inserted in an intrinsically known manner into the hydraulic block 14 and are hydraulically connected to one another and to the piston pump.

A cam 16, which can be driven to rotate by an electric motor and is disposed on a face end of the piston 10 in the pump housing 14, is used to drive the piston 10. A piston restoring spring 18 embodied as a helical compression spring is inserted into the pump bore 12 on an end remote from the cam 16. The piston restoring spring 18 engages an end face of the piston 10 remote from the cam 16 and presses the piston against a circumference of the cam 16. When the cam 16 is driven to rotate, the cam drives the piston 10 into a reciprocating stroke motion in the axial direction, counter to a force of the piston restoring spring 18. For the sake of an inexpensive manufacture, the piston 10 is embodied essentially as a full cylinder. In order to admit brake fluid into a displacement chamber 20 of the piston pump, which is disposed in the pump bore 12 on the end face of the piston 10 remote from the cam 16, the piston 10 is provided with two lateral bores 22 that cross each other approximately in its longitudinal middle, which cross an axial blind bore 24 close to its bottom, the blind bore lets out on the end face of the piston 10 remote from the cam 16, i.e. feeds into the displacement chamber 20. An inlet bore 26 is let into the hydraulic block that constitutes the pump housing 14, which inlet bore feeds into the pump bore 12 of the pump housing 14 approximately at the level of the lateral bores 22 of the piston 10. Through the pump bore 12, the inlet bore 26 communicates with the lateral bores 22 and through these, communicates with the blind bore 24 leading to the displacement chamber.

The mouth of the blind bore 24 that is disposed in the piston 10 and is oriented toward the displacement chamber 20 is conically embodied as a valve seat 28 of an inlet valve 30 of the piston pump, which valve is embodied as a spring-loaded check valve. The inlet valve 30 has a valve ball 32 as a valve closing body, which is pressed against the valve seat 28 by a valve closing spring 34 embodied in the form of a helical compression spring. The valve ball 32 and the valve closing spring 34 are contained in a cup-shaped valve cage 36 which is attached in the extension of the piston 10 on its end face remote from the cam 16, i.e. oriented toward the displacement chamber 20. The valve cage 36 is a deep-drawn part made of sheet metal, which has through flow openings 38 on the circumference and bottom. The valve closing spring 34 is supported on the inside against the bottom 40 of the valve cage 36. The valve cage 36 is disposed in the displacement chamber 20 of the piston pump.

For fastening to the piston 10, the valve cage 36 has an annular step 42, with which it widens toward an open end and with which it rests against the end face of the piston 10 remote from the cam 16. A free rim of the valve cage 36 is shaped so that it protrudes radially outward forming a spring plate 44 against which the piston restoring spring 18 presses. By way of the spring plate 44 and the annular step 42, the piston restoring spring 18 presses the piston 10 in the axial direction of the piston 10 in contact with the circumference of the cam 16, which can be driven to rotate and is disposed on the end face of the piston 10 remote from the piston restoring spring 18. At the same time, the piston restoring spring 18 holds the valve cage 36 with the valve closing spring 34 and the valve ball 32 disposed in it against the end face of the piston 10 oriented toward the displacement chamber 20. The piston restoring spring 18 is embodied as considerably more powerful than the valve closing spring 34 so that the piston restoring spring 18 holds the valve cage 36 against the piston 10 counter to the force of the valve closing spring 34 at all loads that occur during operation of the piston pump.

The displacement chamber 20, which is part of the pump bore 12, is enclosed on an end face remote from the cam 16 by a stopper 46, which is inserted into a mouth of the pump bore 12 and is held there in a pressure tight, sealed fashion by means of a continuous caulking 48 of the pump housing 14. The piston restoring spring 18 is supported on an end face 50 of the stopper 46 oriented toward the displacement chamber 20. In order to let brake fluid out of the displacement chamber 20 of the piston pump, a short axial blind bore 52 is let into the stopper 46 and a radial bore 54 leads from this blind bore to the circumference of the stopper 46. The radial bore 54 feeds into an annular conduit 56 that encompasses the stopper 46, leading from which an outlet bore 58 is let into the pump housing 14. A check valve is inserted as an outlet valve 60 into the radial bore 54 in the stopper 46 and, for the sake of improved clarity, is only depicted in symbolic fashion in the drawing. The outlet valve 60 can also be embodied at another location (for example in the outlet bore 58).

The piston 10 has a larger diameter section 10a on its end oriented toward the cam 16 and a smaller diameter section 10b on its end remote from the cam 16, i.e. the end oriented toward the displacement chamber 20. The diameters of the two sections 10a, 10b of the piston 10 differ only slightly. A transition 62 from the smaller diameter section 10b to the larger diameter section 10a is disposed axially between the lateral bores 20 and the end face of the piston 10 remote from the cam 16. The transition 62 can, for example, be carried out with a radial or conical annular step; in the exemplary embodiment shown, the transition 62 is embodied as continuous with circumferential curvatures 62a, 62b. The transition 62 constitutes a support face of the piston 10. The piston 10 can, for example, be produced by means of machining or shaping, for example by means of cold forming, wherein the shaping constitutes an inexpensive manufacturing possibility. Since the diameters of the two sections 10a, 10b of the piston 10 differ only slightly, only a slight material abrasion or a slight material shaping is required in order to embody the smaller diameter section 10b and the transition 62 on the piston 10.

A support ring 64 is slid onto the piston 10, whose opening widens from a smaller diameter 64a to a larger diameter 64c by way of a conical annular step 64b. With its conical annular step 64b, the support ring 64 is supported in the axial direction at the transition 62 from the smaller diameter section 10b of the piston 10 to the larger diameter section 10a.

A guide ring 66, which is made of polytetrafluoroethylene (PTFE) and encompasses the support ring 64 on the circumference, is disposed on the support ring 64 and rests against the inside of the pump bore 12 in a movable fashion. In the exemplary embodiment depicted, the guide ring 66 has an L-shaped annular cross section, wherein one leg 66a of the guide ring 66 that constitutes a hollow cylinder encompasses the support ring 64 on its circumference and rests against the inside of the pump bore 12 and another leg 66b of the L-shaped annular cross section of the guide ring 66, which other leg constitutes a perforated disk, protrudes in one piece from a leg 66a radially inward to the smaller diameter section 10b of the piston 10. This other leg 66b of the guide ring 66 that constitutes an annular disk rests against an end face of the support ring 64 oriented toward the displacement chamber 20. On an end remote from the other leg 66b, the one leg 66a has an inward protruding bead 66c with which the guide ring 66a axially overlaps the support ring 64 after the fashion of a clip connection and in this manner, is connected to the support ring 64. The guide ring 66 guides the piston 10 on its end oriented toward the displacement chamber 20 axially in the pump bore 12 by way of the support ring 64.

In order to seal the piston 10 in the pump housing 14, an elastomer sealing ring 68 is slid onto the smaller diameter section 10b of the piston 10, which is disposed axially between the support ring 64 with the guide ring 66 and the spring plate 44 and is secured axially to the piston 10 in this manner. An axial distance between the guide ring 66 and the spring plate 44 is greater than an axial thickness of the elastomer sealing ring 68 so that it is not axially pre-stressed.

An end of the piston 10 oriented toward the cam 16 is axially guided in a tapered section 70 of the pump bore 12 and is sealed by means of an O-ring 72, which is inserted into a circumferential groove 74 that is let into the tapered section 70 of the pump bore 12. The piston 10 is thus axially guided with its larger diameter section 10a against the side of the cam 16.

In its larger diameter section 64c, the support ring 64 has a press fit with the larger diameter section 10a of the piston 10; in the smaller diameter section 64a, the support ring 64 has a handle fit in relation to the smaller diameter section 10b of the piston 10. Firstly, this has the advantage that the support ring 64 can be slid onto the piston 10 without trouble and without the danger of a damage to an inner surface of the support ring 64 or an outer surface of the piston 10, until it reaches the transition 62 and only upon reaching the transition 62 does it have to be pressed a short way onto the piston 10 in the axial direction. Another advantage is that the support ring 64 and together with it, the guide ring 66, is secured coaxially to the larger diameter section 10a of the piston 10, i.e. to the section 10a in which the end of the piston 10 oriented toward the cam 16 is also guided in the pump housing 14. As a result, a precisely flush guidance of the piston 10 is assured both in the tapered section 70 of the pump housing 14 and in the region of the guide ring 66. Another advantage of the press fitting of the support ring 64 on the larger diameter section 10a of the piston 10 and therefore the flush alignment of the support ring 64 together with the guide ring 66 on the larger diameter section 10a of the piston 10 is that the larger diameter section 10a of the piston 10 can be manufactured with extremely precise tolerances, for example by means of throughfeed grinding with high fit quality and high surface quality and in addition, can be produced in a relatively simple manner. The cost for producing the smaller diameter section 10b with the same qualities would be considerably higher. In addition, a production of the smaller diameter section 10b that was precisely flush to the larger diameter section 10a, which would be necessary if one end of the piston 10 were guided at the larger diameter section 10a and the other end of the piston 10 were guided at the smaller diameter section 10b, would further increase the manufacturing costs.

Figure 2:
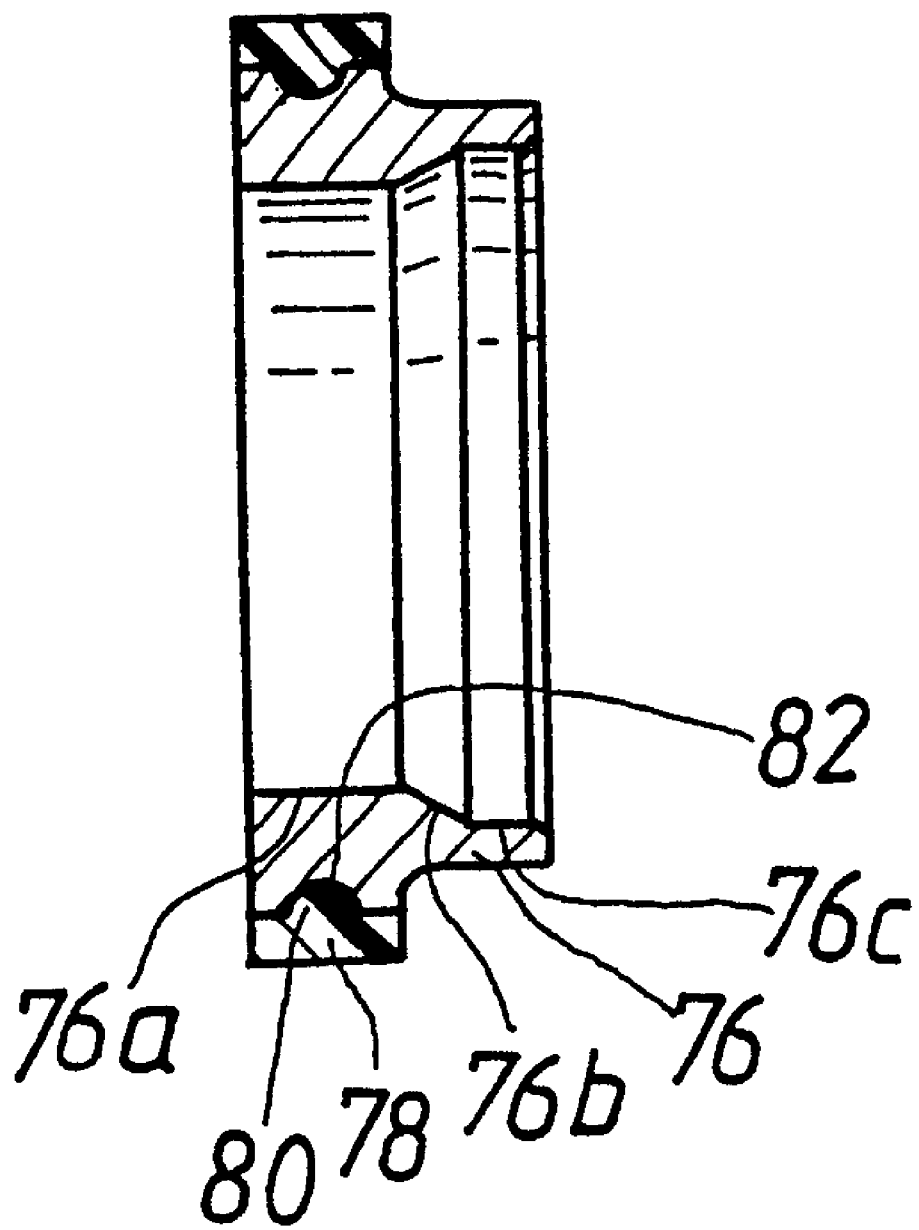
FIG. 2 shows a modified support ring with a guide ring for the piston pump according to the invention shown in FIG. 1.

FIG. 2 shows a support ring 76 whose inner opening transitions from a smaller diameter 76a to a larger diameter 76c by way of a conical annular step 76b, as in the support ring 64 shown in FIG. 1. In this respect, the support ring 76 matches the support ring 64. In contrast to the support ring 64, the support ring 76 is extruded with a guide ring 78, which encompasses the support ring 76 on the circumference. Instead of being detachably connected to the support ring 76 by means of a clip connection, the guide ring 78 is thus non-detachably connected to the support ring 76 by means of extrusion. In order to improve the hold on the support ring 76, the guide ring 78 has a continuous bead 80 protruding inward with a semicircular cross section, which rests in a groove 82 of the support ring 76 that has a semicircular groove cross section. The guide ring 78 encompasses the support ring 76 only on its circumference; the guide ring 78 does not overlap an end face of the support ring 76. Otherwise, the support ring 76 with the guide ring 78 shown in FIG. 2 matches the support ring 64 with the guide ring 66 shown in FIG. 1 and can be used in its place with no trouble.

The foregoing relates to preferred exemplary embodiments of the invention, it being understood that other variants and embodiments thereof are possible within the spirit and scope of the invention, the latter being defined by the appended claims.

What is claimed is:

1. A piston pump for a hydraulic vehicle brake system, comprising a piston that is guided so that the piston moves axially in a pump housing and is driven into a reciprocating stroke motion in an axial direction, a guide ring that is slid onto the piston, which guides the piston axially in the pump housing, and with a support ring that is attached to the piston and moves along with the piston, against the guide ring which is supported axially in at least one direction, and means to connect the guide ring (66; 78) directly to the support ring (64; 76).

2. The piston pump according to claim 1, in which the means which connect the guide ring (66) to the support ring (64) is a clip connection (66c).

3. The piston pump according to claim 2, in which the piston (10) has a support face (62) against which the support ring (64; 76) is supported axially in at least one direction.

4. The piston pump according to claim 3, in which the piston (10) has a larger diameter section (10a) and a smaller diameter section (10b), and that a transition (62) between the larger diameter section (10a) and the smaller diameter section (10b) of the piston (10) constitutes a support face of the piston (10).

5. The piston pump according to claim 4, in which the support ring (64; 76) is held in a radial direction by the larger diameter section (10a) of the piston (10).

6. The piston pump according to claim 1, in which the means which connects the guide ring (78) to the support ring (76) is their being extruded together.

7. The piston pump according to claim 6, in which the piston (10) has a support face (62) against which the support ring (64; 76) is supported axially in at least one direction.

8. The piston pump according to claim 7, in which the piston (10) has a larger diameter section (10a) and a smaller diameter section (10b), and that a transition (62) between the larger diameter section (10a) and the smaller diameter section (10b) of the piston (10) constitutes a support face of the piston (10).

9. The piston pump according to claim 8, in which the support ring (64; 76) is held in a radial direction by the larger diameter section (10a) of the piston (10).

10. The piston pump according to claim 1, in which the support ring (64; 76) is pressed onto the piston (10) with a frictional, non-positive fit.

11. The piston pump according to claim 10, in which the piston (10) has a support face (62) against which the support ring (64; 76) is supported axially in at least one direction.

12. The piston pump according to claim 11, in which the piston (10) has a larger diameter section (10a) and a smaller diameter section (10b), and that a transition (62) between the larger diameter section (10a) and the smaller diameter section (10b) of the piston (10) constitutes a support face of the piston (10).

13. The piston pump according to claim 12, in which the support ring (64; 76) is held in a radial direction by the larger diameter section (10a) of the piston (10).

14. The piston pump according to claim 1, in which the piston (10) has a support face (62) against which the support ring (64; 76) is supported axially in at least one direction.

15. The piston pump according to claim 4, in which the piston (10) has a larger diameter section (10a) and a smaller diameter section (10b), and that a transition (62) between the larger diameter section (10a) and the smaller diameter section (10b) of the piston (10) constitutes a support face of the piston (10).

16. The piston pump according to claim 15, in which the support ring (64; 76) is held in a radial direction by the larger diameter section (10a) of the piston (10).

* * * * *